(12) United States Patent
Nguyen

(10) Patent No.: US 11,022,930 B2
(45) Date of Patent: Jun. 1, 2021

(54) MOUNTING BASE AND IMAGE FORMING APPARATUS SET

(71) Applicant: KYOCERA Document Solutions Inc., Osaka (JP)

(72) Inventor: Chien Danh Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/957,705

(22) PCT Filed: Oct. 4, 2018

(86) PCT No.: PCT/JP2018/037203
§ 371 (c)(1),
(2) Date: Jun. 24, 2020

(87) PCT Pub. No.: WO2019/130707
PCT Pub. Date: Jul. 4, 2019

(65) Prior Publication Data
US 2020/0363766 A1     Nov. 19, 2020

(30) Foreign Application Priority Data
Dec. 25, 2017   (JP) .............................. JP2017-247805

(51) Int. Cl.
*G03G 15/00*         (2006.01)
*B41J 29/06*         (2006.01)
(Continued)

(52) U.S. Cl.
CPC ..... *G03G 21/1604* (2013.01); *G03G 21/1647* (2013.01); *G03G 2221/1654* (2013.01); *G03G 2221/1684* (2013.01)

(58) Field of Classification Search
CPC ........... G03G 21/1604; G03G 21/1647; G03G 2221/1654; G03G 2221/1684
See application file for complete search history.

(56) References Cited

U.S. PATENT DOCUMENTS 4,969,010 A    11/1990   Tamura et al.
5,049,945 A     9/1991   Fukano et al.
(Continued)

FOREIGN PATENT DOCUMENTS

JP     S58-049484 U    4/1983
JP     H01-140169 A    6/1989
(Continued)

*Primary Examiner* — Clayton E. LaBalle
*Assistant Examiner* — Michael A Harrison
(74) *Attorney, Agent, or Firm* — Studebaker & Brackett PC

(57) ABSTRACT

An image forming apparatus set (200) includes an image forming apparatus (100) and a mounting base (3) on which the image forming apparatus (100) is placed. The mounting base (3) includes a locking mechanism (R). When the image forming apparatus (100) is placed at a first position in the mounting base (3), the locking mechanism (R) restricts movement of the image forming apparatus (100) relative to the mounting base (3). The locking mechanism (R) includes a first locking mechanism (4) and a second locking mechanism (R2). The first locking mechanism (4) restricts movement of the image forming apparatus (100) in a first direction (D1) relative to the mounting base (3). The second locking mechanism (R2) restricts movement of the image forming apparatus (100) in a second direction (D2) relative to the mounting base (3). The second direction (D2) is opposite to the first direction (D1).

17 Claims, 12 Drawing Sheets

(51) Int. Cl.
*A47B 97/00* (2006.01)
*G03G 21/16* (2006.01)

(56) References Cited

U.S. PATENT DOCUMENTS

| | | | | |
|---|---|---|---|---|
| 5,975,515 A | * | 11/1999 | Capri | ........................ B65H 1/04 |
| | | | | 271/145 |
| 2004/0264998 A1 | * | 12/2004 | Uchida | .............. G03G 21/1647 |
| | | | | 399/107 |

FOREIGN PATENT DOCUMENTS

| JP | H02-120876 U | 9/1990 |
|---|---|---|
| JP | H02-222979 A | 9/1990 |
| JP | H10-246999 A | 9/1998 |
| JP | 2006-350084 A | 12/2006 |

\* cited by examiner

MOUNTING BASE AND IMAGE FORMING APPARATUS SET

TECHNICAL FIELD

The present invention relates to a mounting base and an image forming apparatus set.

BACKGROUND ART

A mounting base disclosed in Patent Literature 1 is arranged below an image forming apparatus and includes a plate-shaped member and a plurality of engaging members. The plate-shaped member has a size larger than a projected area of at least the image forming apparatus on the floor. The engaging members are provided on the plate-shaped member. The image forming apparatus includes a base frame and a plurality of engagement target members. Each of the engagement target members is provided at the base frame. The engaging members each engage with a corresponding one of the engagement target members. Specifically, the engaging members engage with the respective engagement target members through bolt screwing.

CITATION LIST

Patent Literature

[Patent Literature 1] Japanese Patent Application Laid-Open Publication No. 10-246999

SUMMARY OF INVENTION

Technical Problem

However, it is bothersome to fix the image forming apparatus to the mounting base disclosed in Patent Literature 1.

The present invention has been made in view of the foregoing and has its object of providing a mounting base to which an image forming apparatus can be easily fixed, and an image forming apparatus set.

Solution to Problem

A mounting base according to the present invention is a mounting base that allows an image forming apparatus to be placed thereon and includes a locking mechanism. When the image forming apparatus is placed at a first position in the mounting base, the locking mechanism restricts movement of the image forming apparatus relative to the mounting base. The locking mechanism includes a first locking mechanism and a second locking mechanism. The first locking mechanism restricts movement of the image forming apparatus in a first direction relative to the mounting base. The second locking mechanism restricts movement of the image forming apparatus in a second direction relative to the mounting base. The second direction is opposite to the first direction.

An image forming apparatus set according to the present invention includes an image forming apparatus and a mounting base on which the image forming apparatus is placed. The mounting base includes a locking mechanism. When the image forming apparatus is placed at a specific position in the mounting base, the locking mechanism restricts movement of the image forming apparatus relative to the mounting base. The locking mechanism includes a first locking mechanism and a second locking mechanism. The first locking mechanism restricts movement of the image forming apparatus in a first direction relative to the mounting base. The second locking mechanism restricts movement of the image forming apparatus in a second direction relative to the mounting base. The second direction is opposite to the first direction.

Advantageous Effects of Invention

According to the mounting base and the image forming apparatus set in the present invention, the image forming apparatus can be easily fixed to the mounting base.

DESCRIPTION OF EMBODIMENTS

Figure 1:
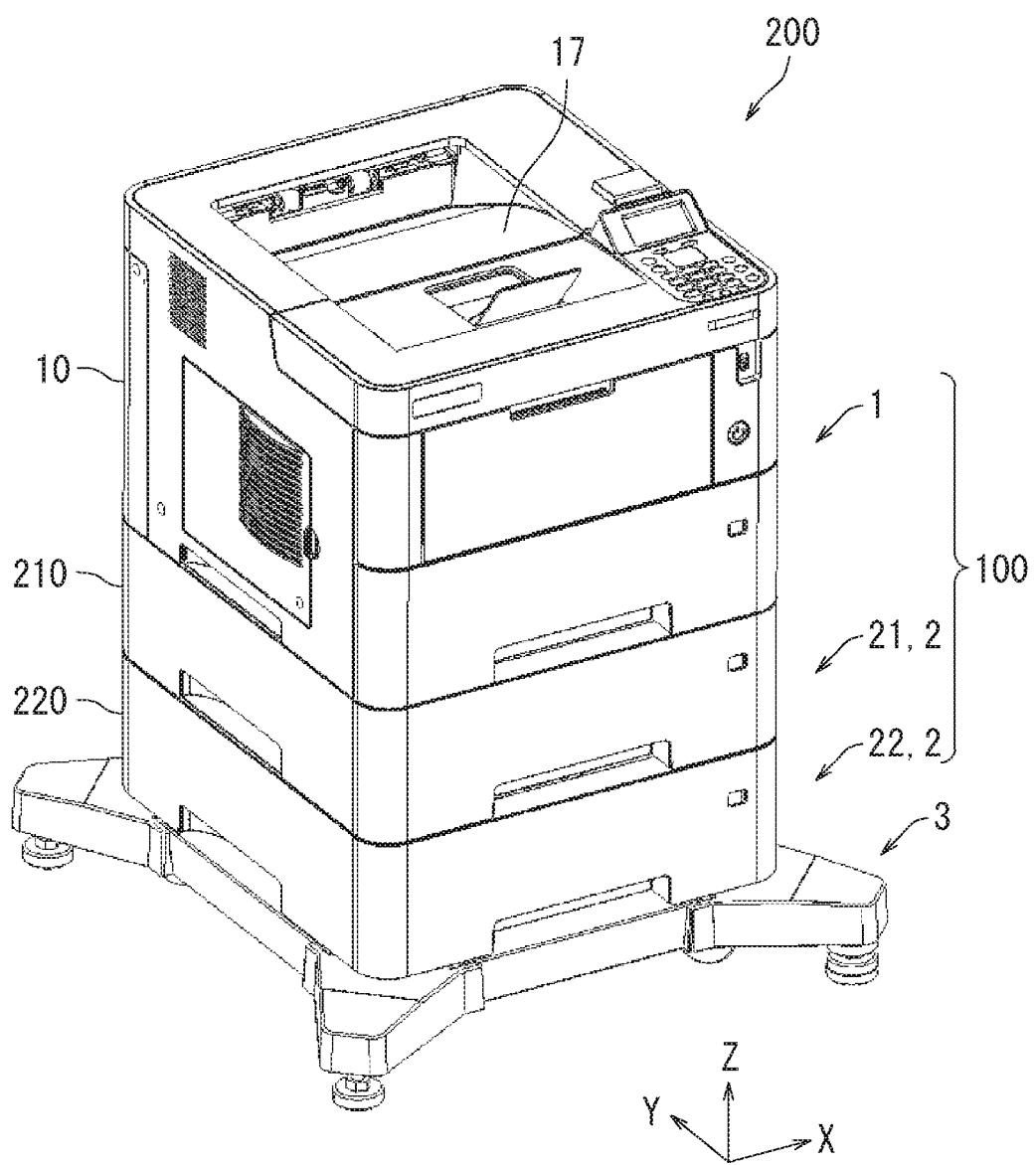
FIG. 1 is a perspective view of a configuration of an image forming apparatus set according to an embodiment of the present invention.

The following describes embodiments of the present invention with reference to the accompanying drawings (FIGS. 1 to 12). Note that elements that are the same or equivalent are indicated by the same reference signs in the drawings and description thereof is not repeated.

A configuration of an image forming apparatus set 200 according to an embodiment of the present invention will be described first with reference to FIG. 1. FIG. 1 is a perspective view of the configuration of the image forming apparatus set 200. As illustrated in FIG. 1, the image forming apparatus set 200 includes an image forming apparatus 100 and a mounting base 3.

In FIG. 1, an X axis, a Y axis, and a Z axis are illustrated that are perpendicular to one another. The X axis and the Y axis are parallel to a horizontal plane. The Z axis is parallel to a vertical direction. In the following description, a side in a positive direction of the Y axis may be denoted as a back side and a side in a negative direction of the Y axis may be denoted as a front side.

The image forming apparatus 100 includes a main body 1 and one or more feeding units 2. The image forming apparatus 100 is separable into the main body 1 and the feeding unit 2. The feeding unit 2 is separable into single feeding units 21 and 22. The main body 1 is a printer. The feeding unit 2 include a first feeding unit 21 and a second feeding unit 22. The first feeding unit 21 is located below the main body 1 and feeds paper to the main body 1. The first feeding unit 21 is fixed to a lower end of the main body 1. The second feeding unit 22 is located below the first feeding unit 21 and feeds paper to the main body 1 via the first feeding unit 21. The second feeding unit 22 is fixed to a lower end of the first feeding unit 21.

The mounting base 3 is arranged below the image forming apparatus 100, and the image forming apparatus 100 is placed on the mounting base 3. Specifically, the mounting base 3 is arranged below the second feeding unit 22 and the second feeding unit 22 is fixed to the mounting base 3.

Figure 2:
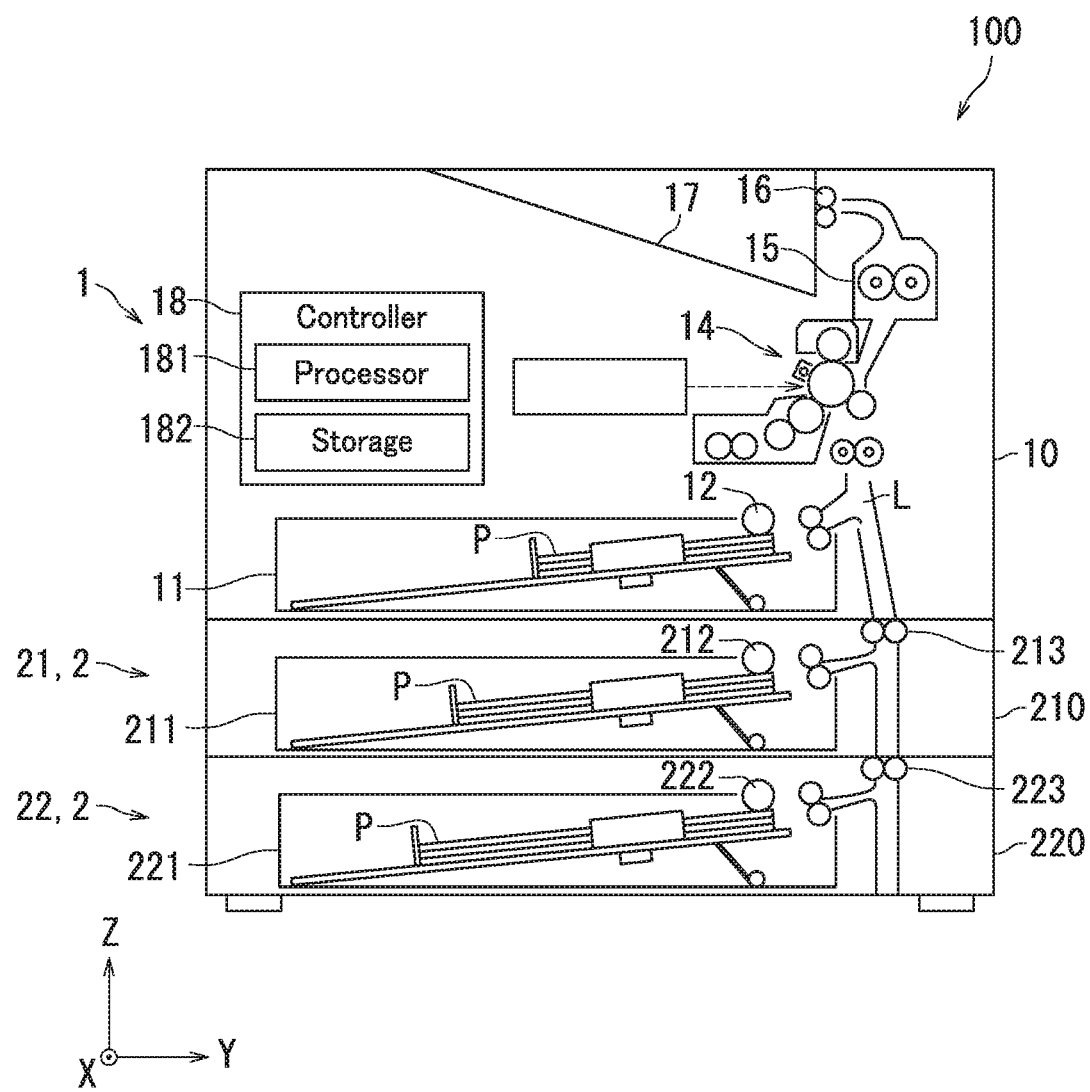
FIG. 2 is a side view of a configuration of an image forming apparatus according to the embodiment of the present invention.

The following describes a configuration of the image forming apparatus 100 with reference to FIGS. 1 and 2. FIG. 2 is a side view of the configuration of the image forming apparatus 100. As illustrated in FIG. 2, the main body 1 includes a housing 10, a feeding cassette 11, a pickup roller 12, a conveyance section L, an image forming section 14, a fixing section 15, an ejection roller pair 16, an exit tray 17, and a controller 18. The housing 10 houses the feeding cassette 11, the pickup roller 12, the conveyance section L, the image forming section 14, the fixing section 15, the ejection roller pair 16, and the controller 18.

Paper P fed from the feeding cassette 11 by the pickup roller 12 is conveyed to the image forming section 14 by the conveyance section L. The image forming section 14 forms an image on the paper P. The paper P corresponds to an example of a "recording medium".

The paper P with the image formed thereon is conveyed to the fixing section 15. The fixing section 15 applies heat and pressure to the paper P to fix the image formed on the paper P to the paper P. The paper P with the image fixed thereto is ejected onto the exit tray 17 by the ejection roller pair 16.

The controller 18 includes a processor 181 and storage 182. The processor includes for example a central processing unit (CPU). The storage 182 includes memory such as semiconductor memory and may include a hard disk drive (HDD). The storage 182 stores a control program therein.

The first feeding unit 21 includes a housing 210, a feeding cassette 211, a pickup roller 212, and a feeding roller pair 213. The housing 210 accommodates the feeding cassette 211, the pickup roller 212, and the feeding roller pair 213.

Paper P fed from the feeding cassette 211 by the pickup roller 212 is forwarded to the conveyance section L by the feeding roller pair 213.

The second feeding unit 22 includes a housing 220, a feeding cassette 221, a pickup roller 222, and a feeding roller pair 223. The housing 220 accommodates the feeding cassette 221, the pickup roller 222, and the feeding roller pair 223. Paper P fed from the feeding cassette 221 by the pickup roller 222 is forwarded to the conveyance section L by the feeding roller pair 213 via the feeding roller pair 213 of the first feeding unit 21.

Figure 3:
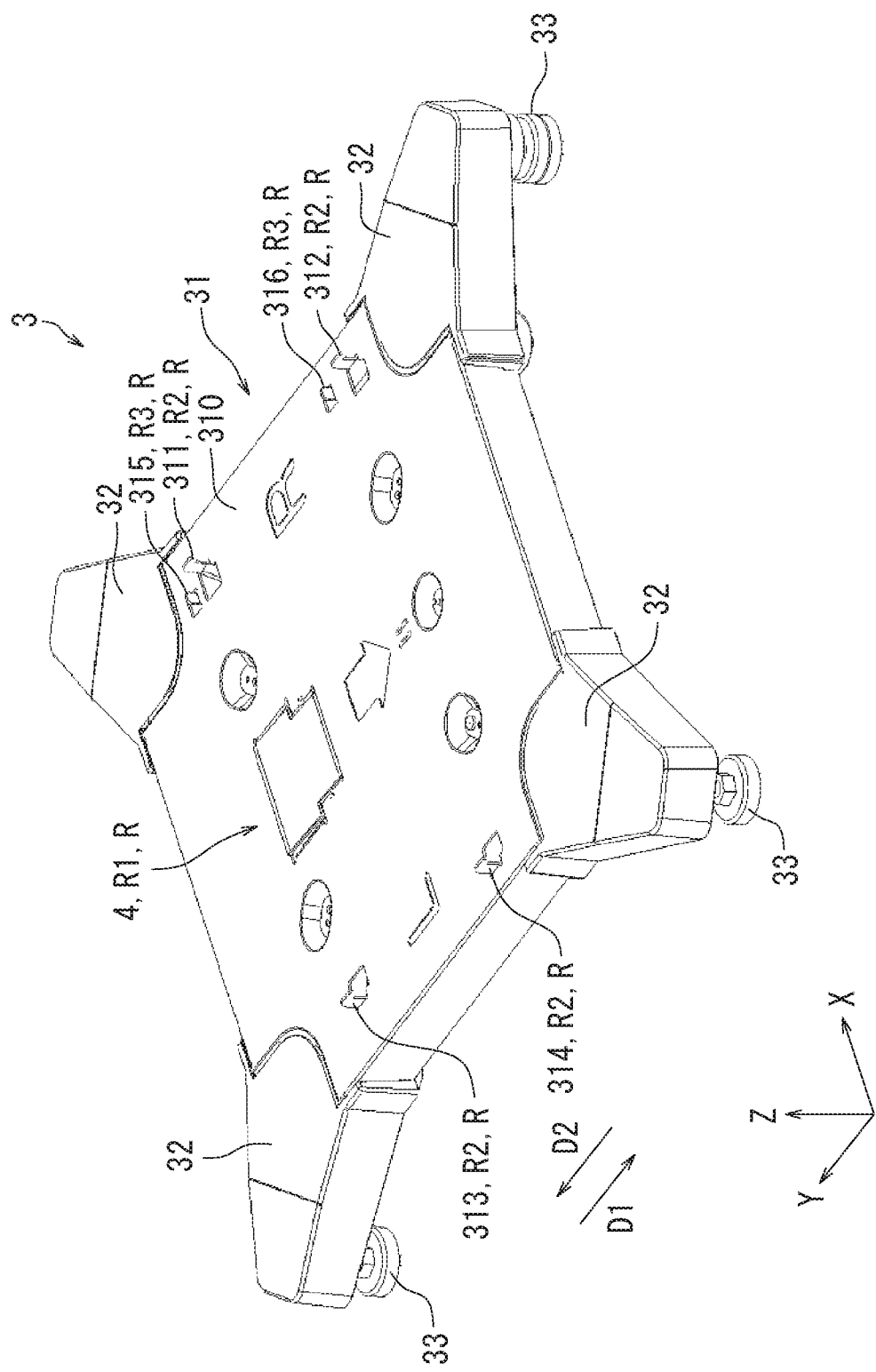
FIG. 3 is a perspective view of a configuration of a mounting base according to the embodiment of the present invention.

The following describes a configuration of the mounting base 3 according to the embodiment of the present invention with reference to FIGS. 1 to 3. FIG. 3 is a perspective view of the configuration of the mounting base 3. As illustrated in FIG. 3, the mounting base 3 includes a base main body 31, four support portions 32, and four legs 33.

The image forming apparatus 100 is placed on the base main body 31. The base main body 31 has a rectangular plate shape. The base main body 31 has four corners that each are supported by a corresponding one of the four support portions 32. The base main body 31 includes a mounting member 310.

The mounting member 310 has a rectangular flat plate shape. The image forming apparatus 100 is placed on the mounting member 310. The mounting member 310 includes a locking mechanism R. The locking mechanism R restricts movement of the image forming apparatus 100 relative to the mounting base 3. The locking mechanism R includes a first locking mechanism R1, a second locking mechanism R2, and a third locking mechanism R3. In the following description, the first locking mechanism R1 may be referred to as a first locking mechanism 4.

The first locking mechanism 4 restricts movement of the image forming apparatus 100 in a first direction D1 relative to the mounting base 3. The first direction D1 is the negative direction of the Y axis. A configuration of the first locking mechanism 4 will be described later in detail with reference to FIGS. 6, 7A, and 7B.

The second locking mechanism R2 includes an engaging member 311, an engaging member 312, an engaging member 313, and an engaging member 314. Each of the engaging members 311 to 314 are provided on an upper surface of the mounting member 310. The second locking mechanism R2 restricts movement of the image forming apparatus 100 in a second direction D2 relative to the mounting base 3. The second direction D2 is the positive direction of the Y axis. That is, the second direction D2 is opposite to the first direction D1.

The engaging member 311 is provided on an end of the mounting member 310 on a side in a positive direction of the X axis and the positive direction of the Y axis. The engaging member 312 is provided on an end of the mounting member 310 on a side in the positive direction of the X axis and the negative direction of the Y axis. The engaging member 313 is provided on an end of the mounting member 310 on a side in a negative direction of the X axis and the positive direction of the Y axis. The engaging member 314 is provided on an end of the mounting member 310 on a side in the negative direction of the X axis and the negative direction of the Y axis. That is, the engaging members 311 to 314 each are located at a corresponding one of four corners of the mounting member 310. The configuration of each of the engaging members 311 to 314 will be described later in detail with reference to FIGS. 4A to 4D. Each of the engaging members 311 to 314 corresponds to one example of a "second engaging member".

The third locking mechanism R3 includes a protrusion 315 and a protrusion 316. The third locking mechanism R3 restricts a movement direction of the image forming apparatus 100 relative to the mounting base 3 to the first direction D1 and the second direction D2. That is, the third locking mechanism R3 allows the image forming apparatus 100 to move only in the first direction D1 and the second direction D2 relative to the mounting base 3. The protrusion 315 is provided on the end of the mounting member 310 on a side in the positive direction of the X axis and the positive direction of the Y axis. Specifically, the protrusion 315 is provided on a positive side of the Y axis relative to the engaging member 311. The protrusion 316 is provided on the end of the mounting member 310 on a side in the positive direction of the X axis and the negative direction of the Y axis. Specifically, the protrusion 316 is provided on the positive side of the Y axis with respect to the engaging member 311.

The protrusion 315 and the protrusion 316 are inserted in respective recesses located in a lower surface part of the image forming apparatus 100. Through insertion thereof, the protrusion 315 and the protrusion 316 restrict a movement direction of the image forming apparatus 100 relative to the mounting base 3 to the first direction D1 and the second direction D2. The recesses will be described later in detail with reference to FIG. 11.

More specifically, the protrusion 315 and the protrusion 316 allow movement of the image forming apparatus 100 relative to the mounting base 3 between a "first position" and a "second position" in the mounting base 3. The "first position" is a position where the image forming apparatus 100 is fixed to the mounting base 3. The "second position" is a position where the image forming apparatus 100 is placed on the mounting base 3. That is, the image forming apparatus 100 is fixed to the mounting base 3 in a manner that the image forming apparatus 100 is placed at the "second position" in the mounting base 3 and then moved to the "first position" in the mounting base 3. The "first position" and the "second position" will be described later in detail with reference to FIGS. 8A to 11. The "first position" corresponds to an example of a "specific position".

The four support portions 32 each support a corresponding one of the four corners of the base main body 31. Each of the four support portions 32 is provided to protrude in a direction away from a center of the base main body 31 on an X-Y plane. Each of the four support portions 32 has a trapezoidal shape when viewed in plan. Each of the four support portions 32 has a tip end supported by a corresponding one of the four legs 33.

The four legs 33 each support a corresponding one of the four support portions 32. Each of the four legs 33 is placed on a floor surface. The four legs 33 are capable of adjusting the height of the mounting base 3. The height of the mounting base 3 is a distance from the floor surface to an upper surface of the mounting base 3 in a Z axis direction. That is, each of the four legs 33 is capable of adjusting a distance from a lower end thereof to the upper surface of the mounting base 3.

As described with reference to FIGS. 1 to 3, the first locking mechanism 4 restricts movement of the image forming apparatus 100 in the first direction D1 relative to the mounting base 3 and the second locking mechanism R2 restricts movement of the image forming apparatus 100 in the second direction D2 relative to the mounting base 3 in the embodiment of the present invention. The second direction D2 is opposite to the first direction D1. Thus, movement of the image forming apparatus 100 relative to the mounting base 3 can be restricted with such a simple configuration. This can facilitate fixing of the image forming apparatus 100 to the mounting base 3.

Furthermore, the third locking mechanism R3 restricts a movement direction of the image forming apparatus 100 relative to the mounting base 3 to the first direction D1 and the second direction D2. The first locking mechanism 4 restricts movement of the image forming apparatus 100 in the first direction D1 relative to the mounting base 3, and the second locking mechanism R2 restricts movement of the image forming apparatus 100 in the second direction D2 relative to the mounting base 3. Thus, movement of the image forming apparatus 100 relative to the mounting base 3 can be restricted by the first locking mechanism 4, the second locking mechanism R2, and the third locking mechanism R3. In the above configuration, the image forming apparatus 100 can be fixed to the mounting base 3.

Note that the second locking mechanism R2 of the mounting base 3 includes the four engaging members 311 to 314 in the embodiment of the present invention, which should not be taken to limit the present invention. It is only required that the second locking mechanism R2 includes at least one engaging member. The smaller the number of the engaging members is, the more the configuration of the mounting base 3 can be simplified.

Figure 4A:
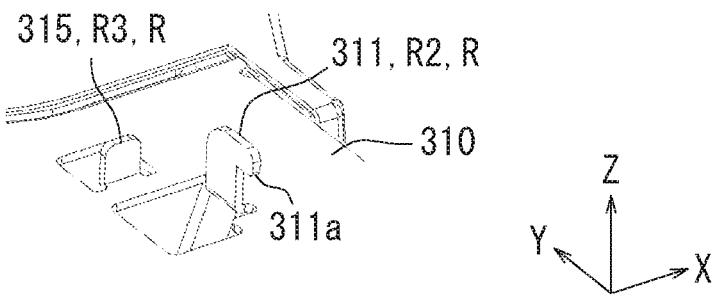
FIG. 4A is a perspective view of a configuration of an engaging member of the mounting base.
Figure 4B:
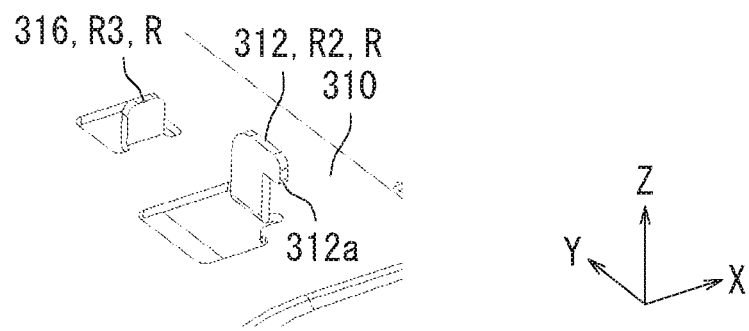
FIG. 4B is a perspective view of a configuration of an engaging member of the mounting base.
Figure 4C:
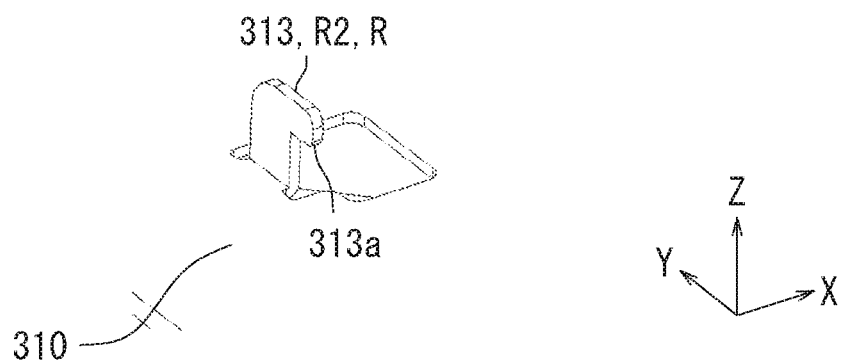
FIG. 4C is a perspective view of a configuration of an engaging member of the mounting base.
Figure 4D:
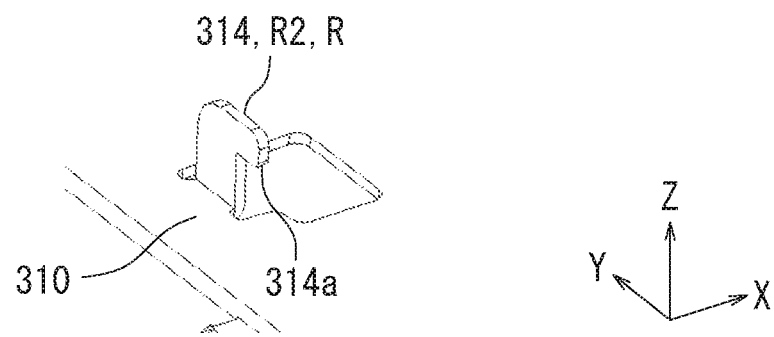
FIG. 4D is a perspective view of a configuration of an engaging member of the mounting base.

The following describes each configuration of the four engaging members 311 to 314 of the mounting base 3 with reference to FIGS. 3 and 4A to 4D. FIGS. 4A to 4D are perspective views of the configurations of the respective four engaging members 311 to 314 of the mounting base 3. Specifically, FIG. 4A illustrates the configuration of the engaging member 311. FIG. 4B illustrates the configuration of the engaging member 312. FIG. 4C illustrates the configuration of the engaging member 313. FIG. 4D illustrates the configuration of the engaging member 314.

As illustrated in FIG. 4A, the engaging member 311 stands in a positive direction of the Z axis from the mounting member 310. The engaging member 311 is a plate-shaped member in an inverted L shape. The engaging member 311 is arranged in parallel to a Y-Z plane. The engaging member 311 includes an engaging portion 311a. The engaging portion 311a is located at a tip end of the engaging member 311 and protrudes in the negative direction of the Y axis.

The protrusion 315 stands in the positive direction of the Z axis from the mounting member 310. The protrusion 315 is a rectangular plate-shaped member. The protrusion 315 is arranged in parallel to an X-Z plane.

As illustrated in FIG. 4B, the engaging member 312 stands in the positive direction of the Z axis from the mounting member 310. The engaging member 312 is a plate-shaped member in an inverted L shape. The engaging member 312 is arranged in parallel to the Y-Z plane. The engaging member 312 includes an engaging portion 312a. The engaging portion 312a is located at a tip end of the engaging member 312 and protrudes in the negative direction of the Y axis.

The protrusion 316 stands in the positive direction of the Z axis from the mounting member 310. The protrusion 316 is a rectangular plate-shaped member. The protrusion 316 is arranged in parallel to the X-Z plane.

As illustrated in FIG. 4C, the engaging member 313 stands in the positive direction of the Z axis from the mounting member 310. The engaging member 313 is a plate-shaped member in an inverted L shape. The engaging member 313 is arranged in parallel to the Y-Z plane. The engaging member 313 includes an engaging portion 313a.

The engaging portion 313a is located at a tip end of the engaging member 313 and protrudes in the negative direction of the Y axis.

As illustrated in FIG. 4D, the engaging member 314 stands in the positive direction of the Z axis from the mounting member 310. The engaging member 314 is a plate-shaped member in an inverted L shape. The engaging member 314 is arranged in parallel to the Y-Z plane. The engaging member 314 includes an engaging portion 314a. The engaging portion 314a is located at a tip end of the engaging member 314 and protrudes in the negative direction of the Y axis.

Figure 5:
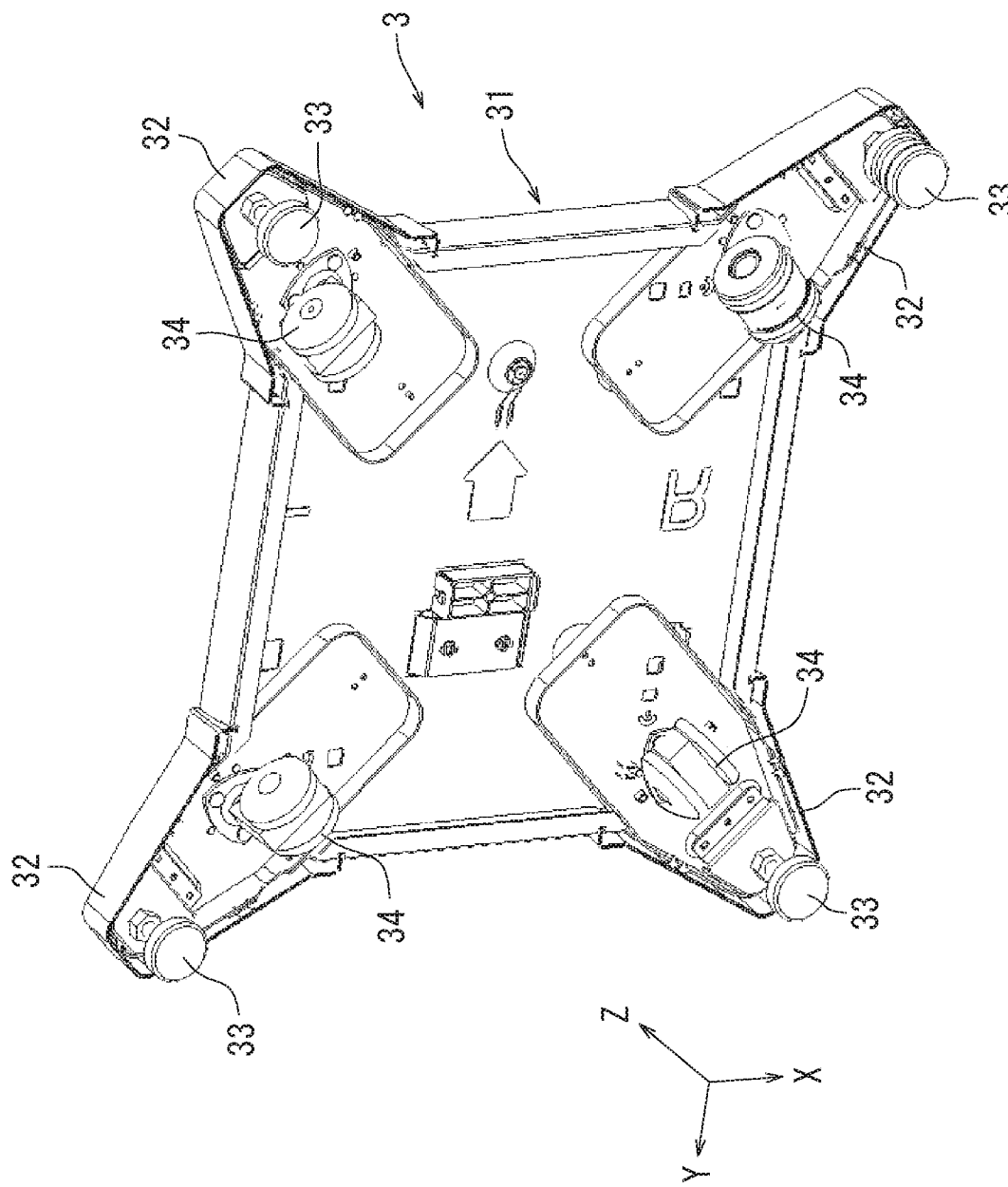
FIG. 5 is a perspective view of the configuration of the mounting base.

The following further describes the mounting base 3 with reference to FIGS. 3 to 5. FIG. 5 is a perspective view of the configuration of the mounting base 3. FIG. 5 illustrates the mounting base 3 as viewed from a side in the negative direction of the Z axis. As illustrated in FIG. 5, the mounting base 3 further includes four casters 34.

The four casters 34 are each provided for a corresponding one of the four support portions 32. The four casters 34 are each capable of supporting a corresponding one of the four support portions 32. Each of the four casters 34 is capable of being placed on the floor surface. Specifically, after the respective distances between lower ends of the four legs 33 and the upper surface of the mounting base 3 are set equal to or smaller than a specific distance, each of the casters 34 is placed on the floor surface and supports a corresponding one of the four support portions 32. The specific distance is for example 50 mm.

Figure 6:
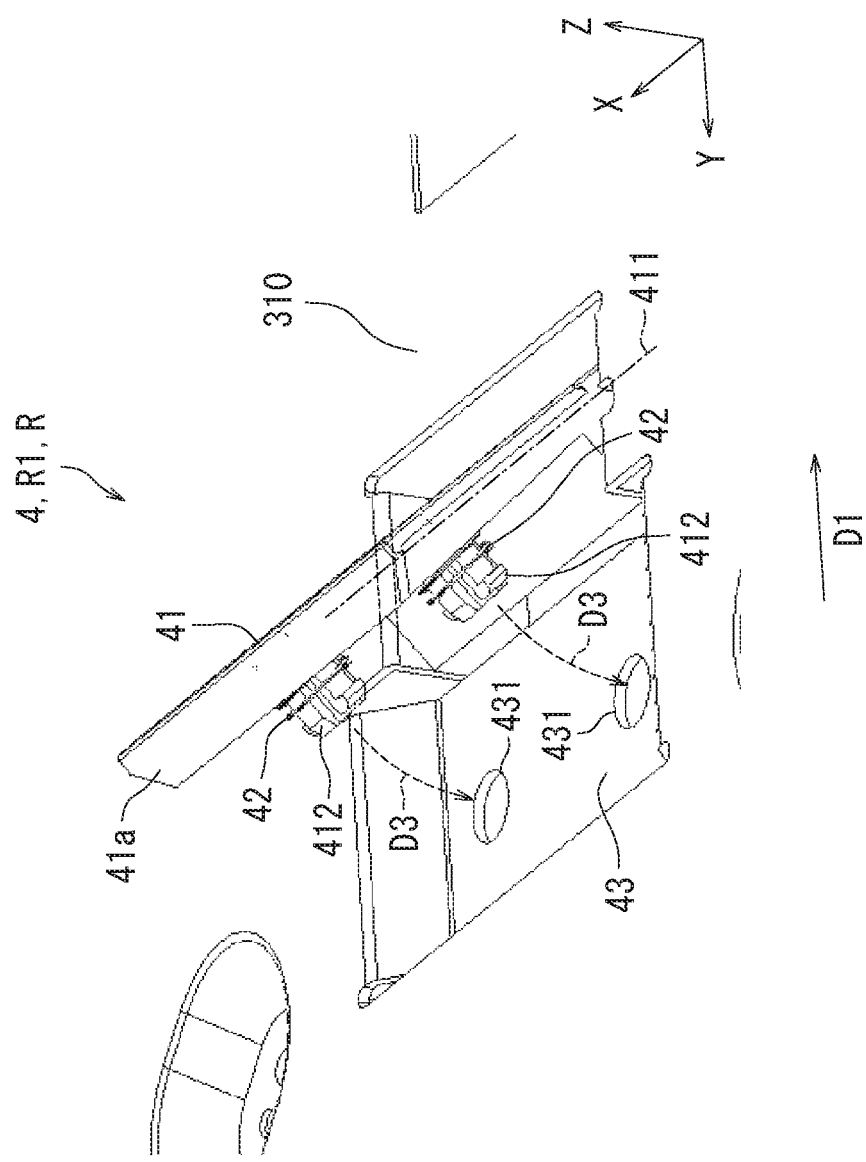
FIG. 6 is a perspective view of a configuration of a first locking mechanism of the mounting base.

The following describes the configuration of the first locking mechanism 4 with reference to FIGS. 1 to 3, 6, 7A, and 7B. FIG. 6 is a perspective view of the configuration of the first locking mechanism 4 of the mounting base 3. As illustrated in FIG. 6, the first locking mechanism 4 includes a protruding member 41, two urging members 42, and a support member 43.

The protruding member 41 has a rectangular plate shape. The protruding member 41 has an axis 411 and includes two regulating members 412. The axis 411 extends in parallel to the X axis along an end of the protruding member 41 in the negative direction of the Y axis. Specifically, the axis 411 extends along one side edge of the protruding member 41. The one side edge thereof is located at an end of the protruding member 41 in the negative direction of the Y axis. The protruding member 41 is turnable about the axis 411 as a center in a direction D3. In a situation in which the protruding member 41 protrudes from the mounting member 310 in the positive direction of the Z axis, the protruding member 41 restricts movement of the image forming apparatus 100 in the first direction D1 relative to the mounting base 3.

The two regulating members 412 each stand in a direction perpendicular to the protruding member 41 from a lower surface of the protruding member 41. The lower surface of the protruding member 41 is one of two main surfaces of the protruding member 41 located on a side close to the support member 43. The two regulating members 412 are columnar bar-shaped members and each are inserted through a corresponding one of the urging members 42 to regulate the position of the corresponding urging member 42. That is, the urging members 42 surrounds outer circumferences of the respective regulating members 412 and each extend and contract in an axial direction of a corresponding one of the regulating members 412.

The two urging members 42 each urge the protruding member 41 so that a part of the protruding member 41 located on a side in the positive direction of the Y axis protrudes in the positive direction of the Z axis from the mounting member 310. The two urging members 42 each are a coil spring, for example.

The support member 43 is a flat plate-shaped member and supports respective lower ends of the two urging members 42. The support member 43 has two holes 431. Each of the two holes 431 has a circular shape. Tip ends (lower ends) of the two regulating members 412 are each inserted in a corresponding one of the two holes 431.

Figure 7A:
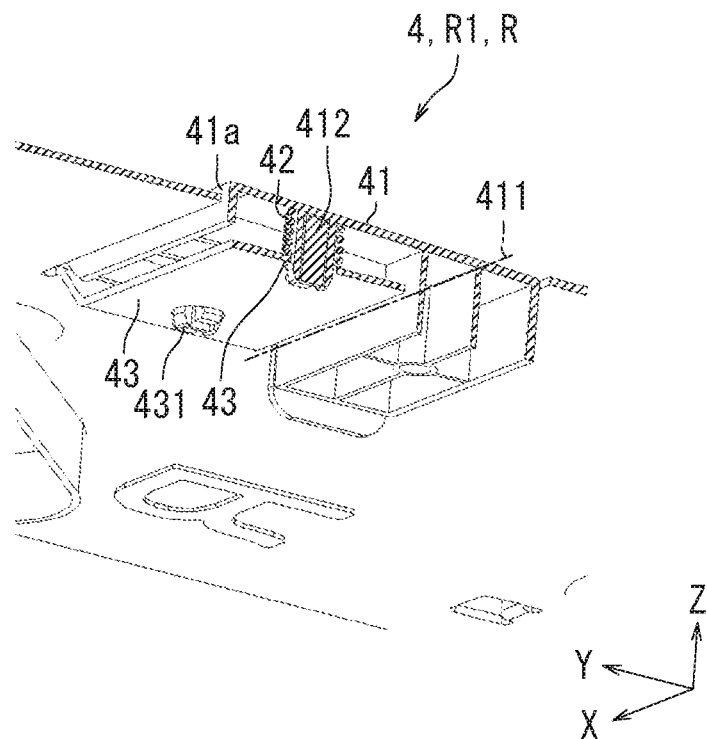
FIG. 7A is a perspective view of the configuration of the first locking mechanism.
Figure 7B:
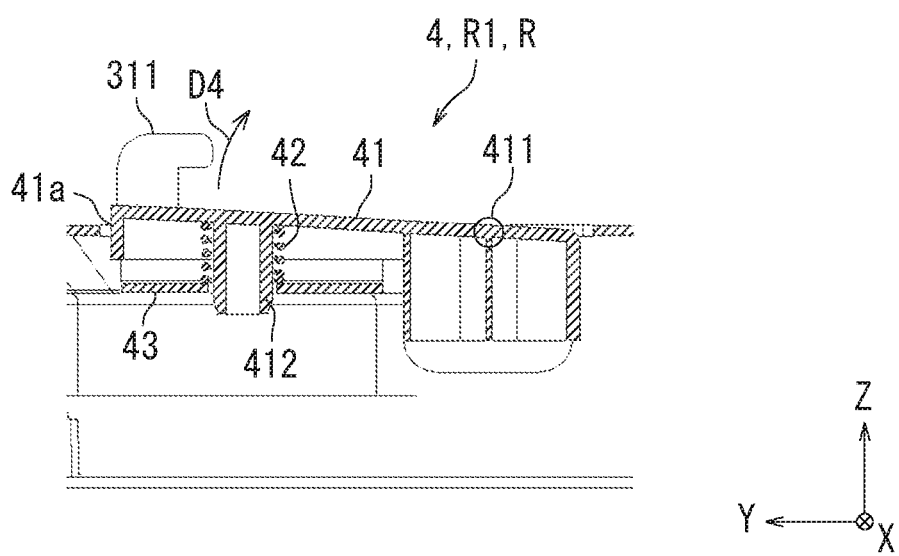
FIG. 7B is a cross-sectional view of the configuration of the first locking mechanism.

FIG. 7A is a perspective cross-sectional view of the configuration of the first locking mechanism 4. FIG. 7B is a cross-sectional view of the configuration of the first locking mechanism 4. Note that FIGS. 7A and 7B each illustrate a section of one of the regulating members 412 located on a side in the negative direction of the X axis on a plane that is parallel to the Y-Z plane and that includes an axial center of the regulating member 412. In FIGS. 7A and 7B, the tip ends of the respective two regulating members 412 are each inserted in a corresponding one of the two holes 431. That is, the lower ends of the respective two urging members 42 are supported on the upper surface of the support member 43 and the upper ends thereof are supported on the lower surface of the protruding member 41. As such, the two urging members 42 are located between the support member 43 and the protruding member 41 in a contracted state. The contracted state is a state in which the urging members 42 have a length shorter than a natural length thereof.

As illustrated in FIG. 7B, the protruding member 41 is urged by the urging members 42 to be turned in a direction D4 about the axis 411 as a center.

Moreover, the protruding member 41 further includes a contact portion 41a as illustrated in FIGS. 7A and 7B. The contact portion 41a is located along aside edge of the protruding member 41 located away from the axis 411. That is, the contact portion 41a is located at an end of the protruding member 41 on a side in the positive direction of the Y axis. The end of the protruding member 41 on a side in the positive direction of the Y axis corresponds to "another side edge" of the protruding member 41. The "one side edge" thereof is located at the end of the protruding member 41 on a side in the negative direction of the Y axis as described above, and therefore, the "another side edge" thereof is opposite to the "one side edge" thereof. The contact portion 41a is a plate-shaped member extending in the X axis direction. The contact portion 41a stands in the negative direction of the Z axis from a bottom surface of the protruding member 41 (toward a side in the negative direction of the Z axis).

The contact portion 41a restricts movement of the image forming apparatus 100 in the first direction D1 relative to the mounting base 3 through coming into contact with a bottom plate of the image forming apparatus 100. The bottom plate of the image forming apparatus 100 will be described later in detail with reference to FIGS. 9A, 9B, 10A and 10B.

As described with reference to FIGS. 1 to 3, 6, 7A, and 7B, the urging members 42 are disposed between the protruding member 41 and the support member 43. In the above configuration, the urging members 42 can be implemented with a simple configuration.

Furthermore, the positions of the urging members 42 are regulated by the respective regulating members 412. This can ensure that the urging members 42 urge the protruding member 41.

Furthermore, the tip ends of the regulating members 412 are inserted into the respective holes 431 of the support member 43. In the above configuration, the urging members 42 are disposed between the protruding member 41 and the support member 43 in an expandable and contractible manner. This can further ensure that the urging members 42 urge the protruding member 41.

Note that the first locking mechanism 4 in the embodiment of the present invention includes the two urging members 42, which should not be taken to limit the present invention. It is only required that the first locking mechanism 4 includes at least one urging member 42. The configuration of the first locking mechanism 4 can be further simplified as the number of the urging members 42 decreases.

Figure 8A:
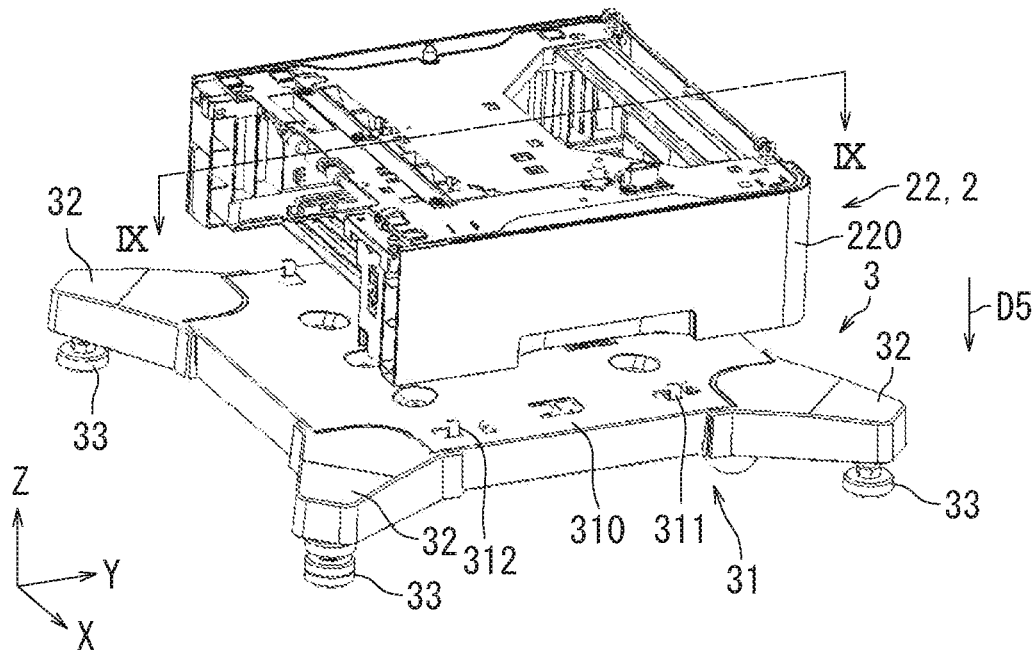
FIG. 8A is a perspective view indicating a positional relationship between the mounting base and a second feeding unit of the image forming apparatus.
Figure 8B:
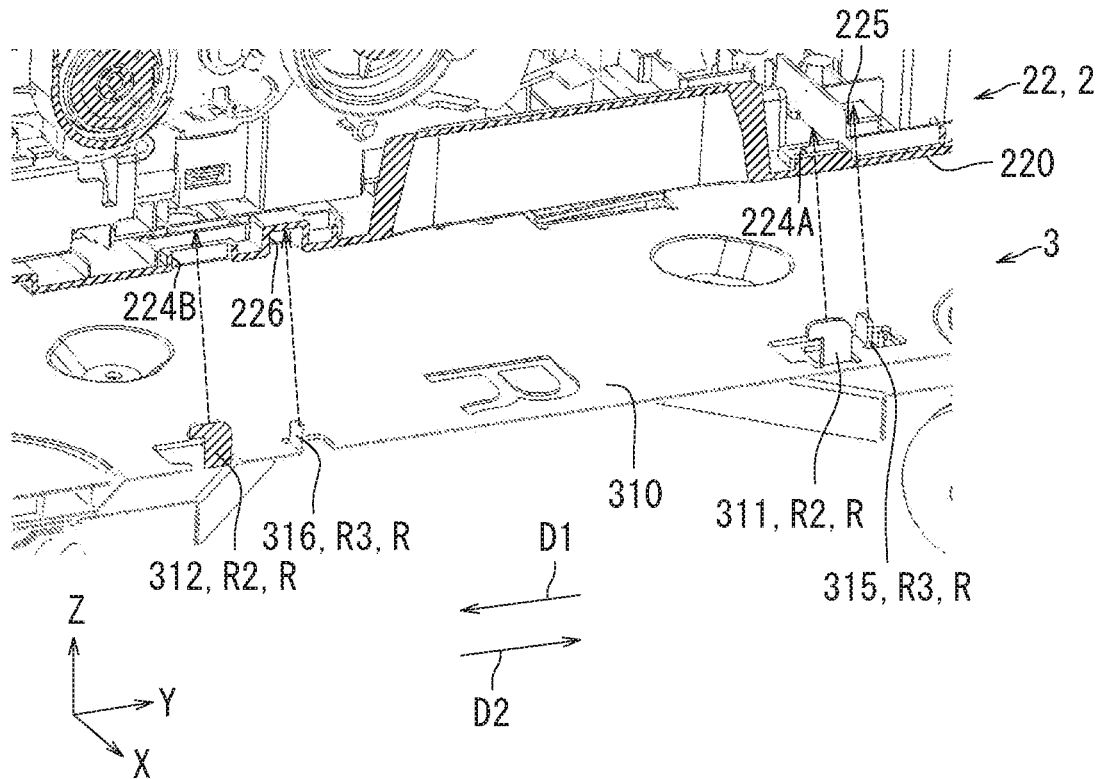
FIG. 8B is a perspective cross-sectional view indicating a second position.

The following describes the "second position" with reference to FIGS. 1 to 4D, 8A and 8B. The "second position" is a position where the image forming apparatus 100 is placed on the mounting base 3. FIG. 8A is a perspective view indicating a positional relationship between the mounting base 3 and the second feeding unit 22 of the image forming apparatus 100. FIG. 8B is a perspective cross-sectional view indicating the "second position". Note that FIG. 8B illustrates a section of the engaging member 312 in a plane that passes a center of the engaging member 312 in the X axis direction (thickness direction of the engaging member 312) and that is parallel to the Y-Z plane. As illustrated in FIG. 8A, the second feeding unit 22 of the image forming apparatus 100 is placed on the upper surface of the mounting base 3. Specifically, the second feeding unit 22 of the image forming apparatus 100 is moved in the negative direction of the Z axis as indicated by a direction D5 to be placed on the mounting base 3.

More specifically, the second feeding unit 22 of the image forming apparatus 100 is placed at the "second position" in the mounting base 3 as illustrated in FIG. 8B. As illustrated in FIG. 1, the image forming apparatus 100 includes the multi-stage second feeding unit 2. In the above configuration, at least the housing 220 of the lowermost second feeding unit 22 has a hole 224A, a hole 224B, a hole 224C, a hole 224D, and a recess 225 and a recess 226. FIG. 8B illustrates the hole 224A and the hole 224B and omits the hole 224C and the hole 224D. In the above configuration, movement of the image forming apparatus 100 including the main body 1 and the multi-stage second feeding unit 2 on the mounting base 3 is restricted. The following describes a state in which the image forming apparatus 100 is placed at the "second position" in the mounting base 3.

The holes 224A to 224D are each located at a position opposite to a corresponding one of the engaging members 311 to 314. The holes 224A 224D each have a rectangular shape and extend in a Y axis direction. The engaging members 311 to 314 are inserted in the holes 224A to 224D, respectively. The holes 221A to 224D each correspond to an example of a "first engaging member".

The recess 225 is located at a position opposite to the protrusion 315 and extends in the X axis direction. The protrusion 315 is inserted in the recess 225. The recess 226 is located at a position opposite to the protrusion 316. The protrusion 316 is inserted in the recess 226.

The "second position" is a position in the mounting base 3 where the protrusion 315 is inserted in the recess 225 and the protrusion 316 is inserted in the recess 226. As such, when the second feeding unit 22 of the image forming apparatus 100 is placed at the "second position" in the mounting base 3, the engaging members 311 to 314 are inserted in the holes 224A to 224D, respectively.

As described with reference to FIGS. 1 to 4D, 8A and 8B, the protrusion 315 is inserted in the recess 225 and the protrusion 316 is inserted in the recess 226 in the embodiment of the present invention. In the above configuration, a movement direction of the image forming apparatus 100 relative to the mounting base 3 is restricted to the first direction D1 and the second direction D2. Thus, the third locking mechanism R3 can be implemented with a simple configuration.

Figure 9A:
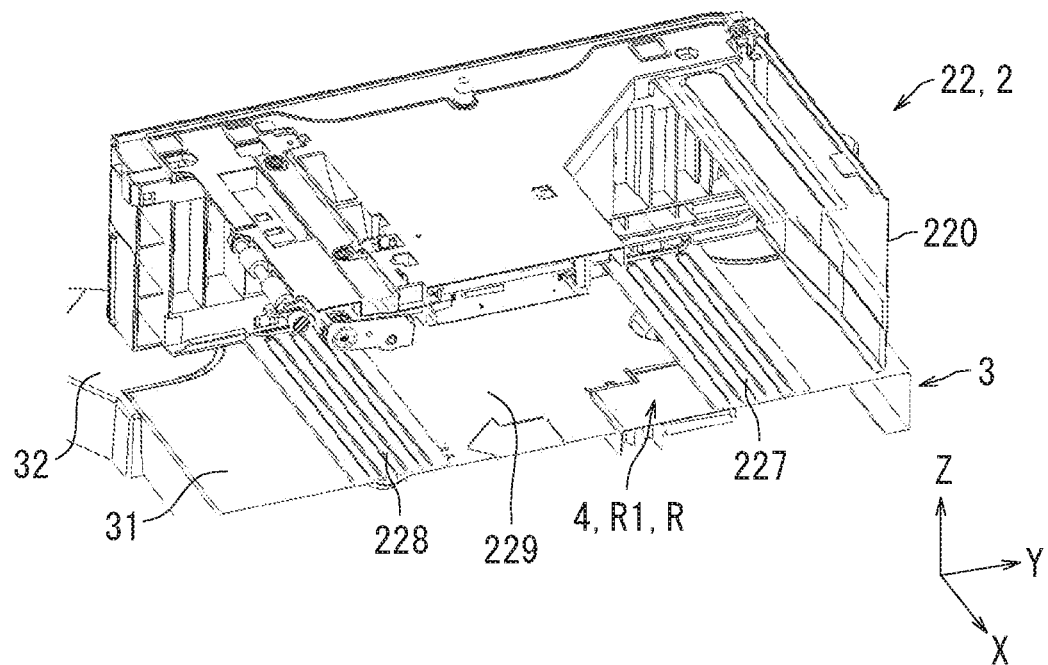
FIG. 9A is a perspective cross-sectional view of the mounting base and the second feeding unit of the image forming apparatus taken along a line IX-IX.

The following describes a function of the first locking mechanism 4 in fixing the image forming apparatus 100 to the mounting base 3 with reference to FIGS. 1 to 3, 6 to 7B and 9A to 10B. FIG. 9A is a perspective cross-sectional view of the mounting base 3 and the second feeding unit 22 of the image forming apparatus 100 in a section taken along a line IX-IX (see FIGS. 8A and 8B). In FIG. 9A, the second feeding unit 22 of the image forming apparatus 100 is placed at the "second position" in the mounting base 3. FIG. 9B is a cross-sectional view of the image forming apparatus 100 and the mounting base 3 illustrated in FIG. 9A in the section taken along the line IX-IX (see FIGS. 8A and 8B). In FIG. 9B, part around the first locking mechanism 4 is illustrated in an enlarged scale. As illustrated in FIG. 9A, the housing 220 further includes a bottom plate 227, a bottom plate 228 and has an opening 229.

The bottom plate 227 and the bottom plate 228 are arranged on the bottom surface of the housing 220. The bottom plate 227 is a plate-shaped member located on a positive side of the Y axis with respect to the bottom plate 228 and extending in the X axis direction in the housing 220. The bottom plate 228 is a plate-shaped member located on a negative side of the Y axis relative to the bottom plate 227 and extending in the X axis direction in the housing 220. The opening 229 is a rectangular opening located between the bottom plate 227 and the bottom plate 228.

Figure 9B:
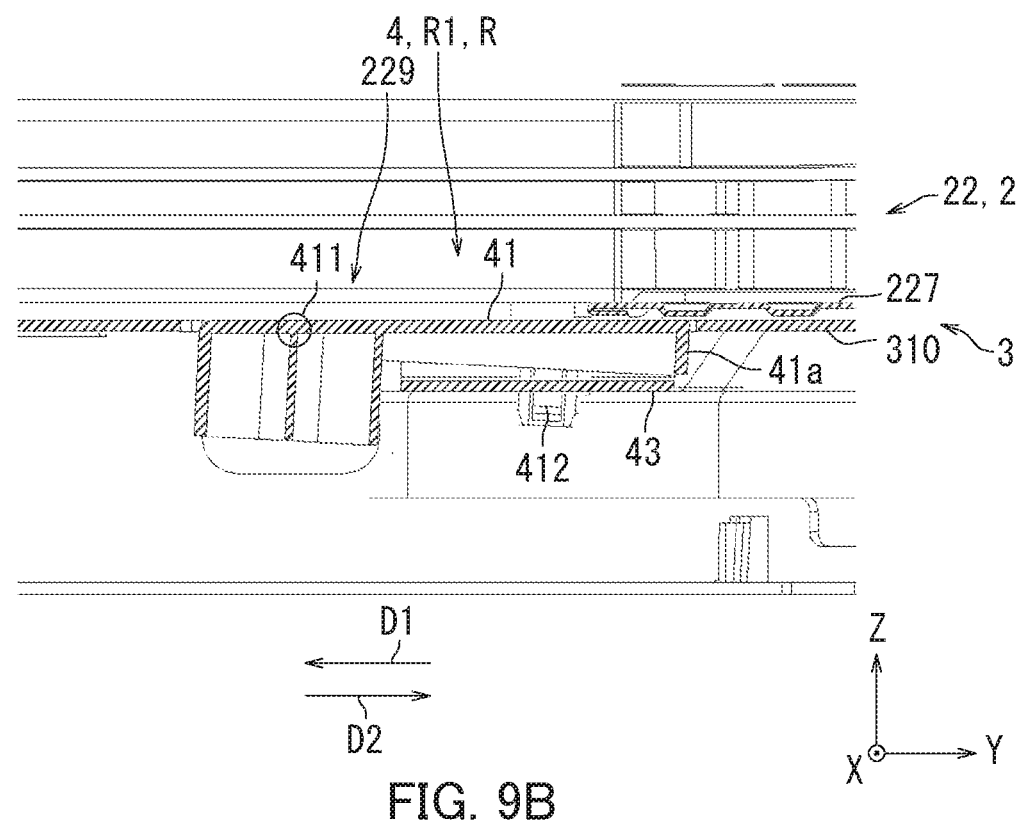
FIG. 9B is a cross-sectional view of the mounting base and the second feeding unit in FIG. 9A taken along the line IX-IX.

As illustrated in FIG. 9B, when the image forming apparatus 100 is placed at the second position in the mounting base 3, the bottom plate 227 pushes the protruding member 41 of the first locking mechanism 4 in the negative direction of the Z axis. The protruding member 41 accordingly does not protrude into the housing 220. That is, the first locking mechanism 4 does not restrict movement of the image forming apparatus 100 in the first direction D1 relative to the mounting base 3. The protruding member 41 is capable of protruding into (toward a side in the positive direction of the Z axis) and retreating from the housing 220 through the opening 229.

Figure 10A:
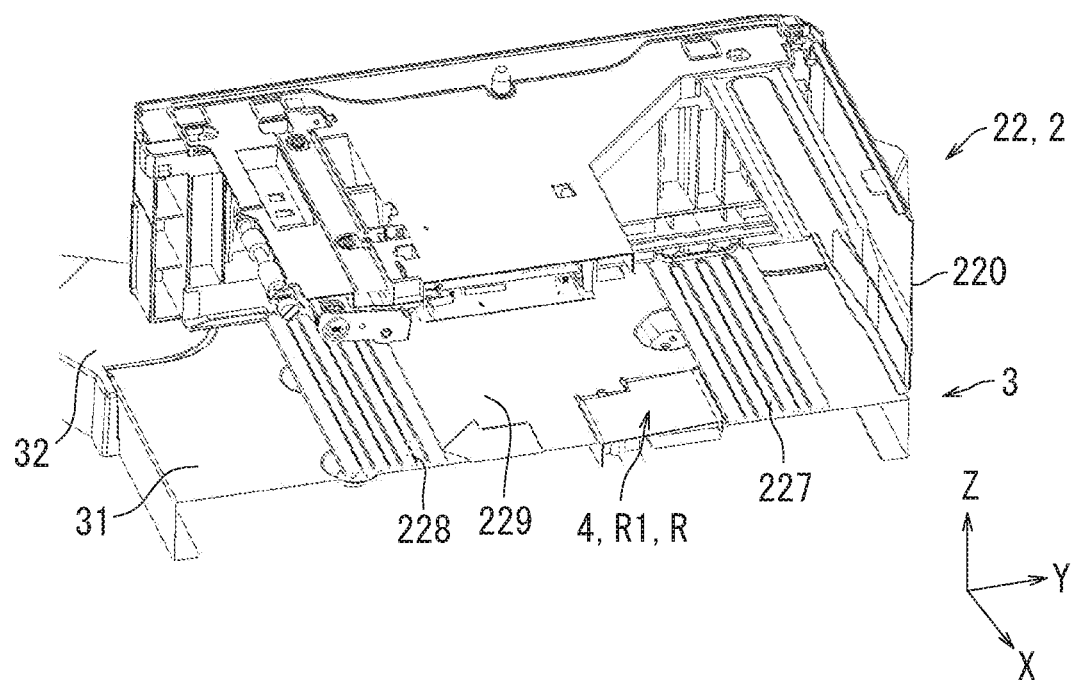
FIG. 10A is a perspective cross-sectional view of the mounting base and the second feeding unit of the image forming apparatus taken along the line IX-IX.
Figure 10B:
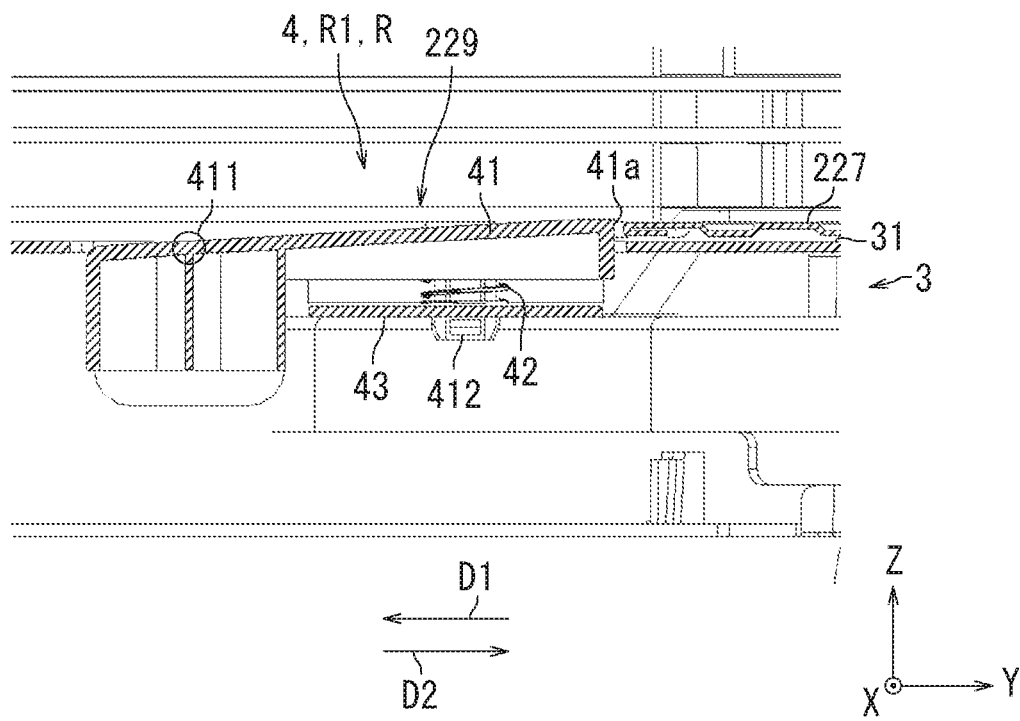
FIG. 10B is a cross-sectional view of the mounting base and the second feeding unit in FIG. 10A taken along the line IX-IX.

FIG. 10A is a perspective cross-sectional view of the mounting base 3 and the second feeding unit 22 of the image forming apparatus 100 in the section taken along the line IX-IX (see FIGS. 8A and 8B). In FIG. 10A, the second feeding unit 22 of the image forming apparatus 100 has been moved to the "first position" in the mounting base 3. FIG. 10B is a cross-sectional view of the mounting base 3 and the second feeding unit 22 of the image forming apparatus 100 illustrated in FIG. 10A in the section taken along the line IX-IX (see FIGS. 8A and 8B). In FIG. 10B, part around the first locking mechanism 4 is illustrated in an enlarged scale.

When the image forming apparatus 100 placed at the "second position" in the mounting base 3 is moved in the second direction D2, the image forming apparatus 100 is placed at the "first position" in the mounting base 3. Specifically, the second feeding unit 22 of the image forming apparatus 100 is slid on the mounting member 310 of the mounting base 3 to be positioned at the "first position" from the "second position" in the mounting base 3. As illustrated in FIG. 10B, once the image forming apparatus 100 is place at the "first position" in the mounting base 3, the protruding member 41 protrudes into the housing 220 (toward a side in the positive direction of the Z axis) through the opening 229.

That is, in a state in which the protruding member 41 protrude, the protruding member 41 turns anticlockwise about the axis 411 as a center and the contact portion 41a accordingly comes into contact with an end of the bottom plate 227 on a side in the negative direction of the Y axis. As a result, the first locking mechanism 4 restricts movement of the image forming apparatus 100 in the first direction D1 relative to the mounting base 3.

As described with reference to FIGS. to 3, 6 to 7B, and 9A to 10B, the protruding member 41 protrudes into the housing 220 through the opening 229 to enable restriction of movement of the image forming apparatus 100 in the first direction D1 relative to the mounting base 3 in the embodiment of the present invention.

Furthermore, when the image forming apparatus 100 is moved from the "first position" to the "second position", the protruding member 41 protrudes into the housing 220 through the opening 229. When the image forming apparatus 100 is positioned at the first position, the opening 229 is positioned opposite to the protruding member 41. In the above configuration, movement of the image forming apparatus 100 in the first direction D1 relative to the mounting base 3 can be easily restricted after the image forming apparatus 100 is moved from the "second position" to the "first position".

Furthermore, movement of the image forming apparatus 100 relative to the mounting base 3 can be restricted through the contact portion 41a of the protruding member 41 coming in contact with the bottom plate 227. Thus, it can be ensured that movement of the image forming apparatus 100 in the first direction D1 relative to the mounting base 3 is restricted.

Figure 11:
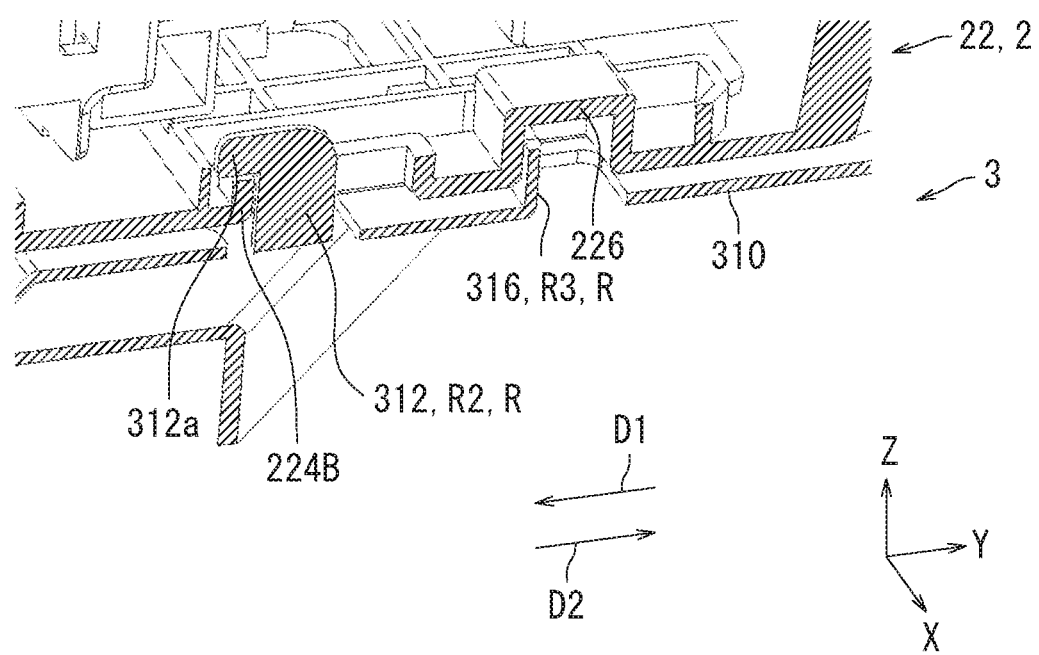
FIG. 11 is an enlarged perspective cross-sectional view of respective parts of the second feeding unit and the mounting base.

The following describes a function of each of the four engaging members 311 to 314 in fixing the image forming apparatus 100 to the mounting base 3 with reference to FIGS. 1 to 4D, 8A, 8B, and 11. FIG. 11 is an enlarged perspective cross-sectional view of respective parts of the image forming apparatus 100 and the mounting base 3. In FIG. 11, the second feeding unit 22 of the image forming apparatus 100 is placed at the "first position" in the mounting base 3 likewise in FIGS. 10A and 10B. Note that FIG. 11 illustrates a section along a plane that passes a center of the engaging member 312 in the X axis direction (thickness direction) and that is parallel to the Y-Z plane. As illustrated in FIG. 11, when the image forming apparatus 100 is placed at the "first position" in the mounting base 3, the engaging portion 312a of the engaging member 312 engages with a peripheral wall of the hole 224B.

Similarly to engagement between the engaging portion 312a of the engaging member 312 and the peripheral wall of the hole 224B, the following function is performed along with movement of the image forming apparatus 100 from the "second position" to the "first position". That is, the engaging portion 311a of the engaging member 311 engages with a peripheral wall of the hole 224A, the engaging portion 313a of the engaging member 313 engages with a peripheral wall of the hole 224C, and the engaging portion 314a of the engaging member 314 engages with a peripheral wall of the hole 224D.

Furthermore, along with movement of the image forming apparatus 100 from the "second position" to the "first position", the protrusion 316 of the mounting base 3 moves in the negative direction of the Y axis relative to the recess 226 of the housing 220 with the protrusion 316 of the mounting base 3 being inserted in the recess 226 of the housing 220. Along with movement of the image forming apparatus 100 from the "second position" to the "first position", the protrusion 315 of the mounting base 3 moves in the negative direction of the Y axis relative to the recess 225 of the housing 220 with the protrusion 315 of the mounting base 3 being inserted in the recess 225 of the housing 220.

As described with reference to FIGS. 1 to 4D, 8A, 8B, and 11, the image forming apparatus 10 is moved to the "first position" in the second direction D2 relative to the mounting base 3 in the embodiment of the present invention. As a result, the engaging member 311 engages with the peripheral wall of the hole 224A. The engaging member 312 engages with the peripheral wall of the hole 224B. The engaging member 313 engages with the peripheral wall of the hole 224C. The engaging member 314 engages with the peripheral wall of the hole 224D. The above configuration can achieve easy restriction of movement of the image forming apparatus 100 in the second direction D2 relative to the mounting base 3.

Figure 12:
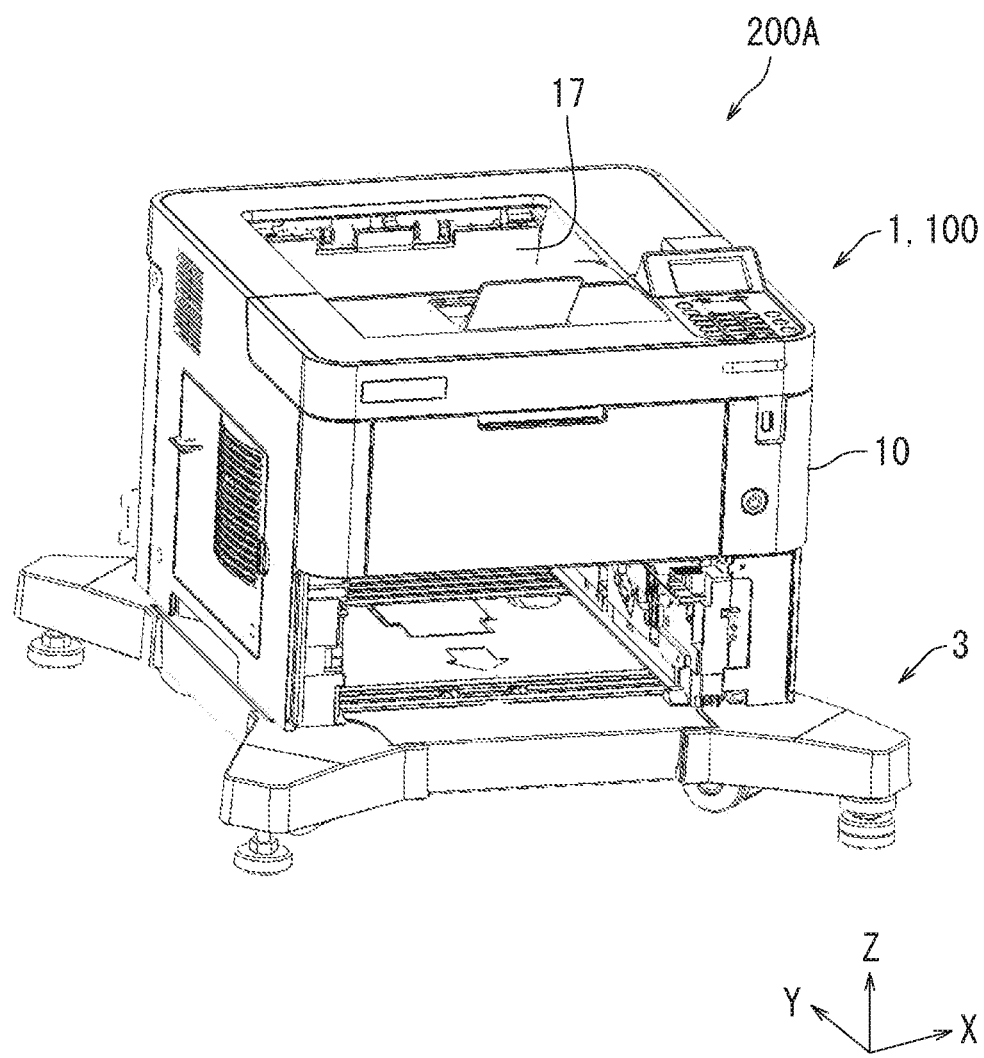
FIG. 12 is a perspective view of a configuration of an image forming apparatus set according to another embodiment of the present invention.

The following describes a configuration of an image forming apparatus set 200A according to another embodiment of the present invention with reference to FIGS. 1 and 12. FIG. 12 is a perspective view of the configuration of the image forming apparatus set 200A. As illustrated in FIG. 12, the image forming apparatus set 200A includes a main body 1 and a mounting base 3. That is, in contrast to the image forming apparatus 100 of the image forming apparatus set 200 illustrated in FIG. 1 including the main body 1 and the feeding units 2, the image forming apparatus 100 of the image forming apparatus set 200A illustrated in FIG. 12 is different therefrom in inclusion of only the main body 1. The following mainly describes the difference of the image forming apparatus set 200A from the image forming apparatus set 200.

As illustrated in FIG. 12, the image forming apparatus set 200A includes a main body 1 and a mounting base 3. The main body 1 is placed on the mounting base 3. The main body 1 includes a housing 10. The housing 10 has a bottom surface that is fixed to the mounting base 3. A hole 224A, a hole 224B, a hole 224C, a hole 224D, a recess 225, and a recess 226 are located in the bottom surface part of the main body 1 likewise the second feeding unit 22 described with reference to FIGS. 8A and 8B.

As described with reference to FIGS. 1 and 12, the bottom surface of the housing 10 of the main body 1 is fixed to the mounting base 3 in this embodiment of the present invention. In the above configuration, movement of the main body 1, which is solely placed on the mounting base 3, on the mounting base 3 can be restricted. Further, it is possible to fix only the main body 1 to the mounting base 3 for use in a case where no printing on paper is necessary.

The embodiments of the present invention have been described so far with reference to the drawings. However, the present disclosure is not limited to the above-described embodiments and can be practiced in various ways within the scope not departing from the gist of the present invention (for example, (1) to (3) below). The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, aspects such as shape and dimension of each element of configuration shown in the above-described embodiments are exemplary only and not particularly limited. Various variations are possible within the scope not substantially departing from the configuration of the present invention.

(1) The image forming apparatus 100 is a printer as described with reference to FIG. 1, which should not be taken to limit the present invention. It is only required that the image forming apparatus 100 includes an image forming section 14. For example, the image forming apparatus 100 may be a multifunction peripheral. Alternatively, the image forming apparatus 100 may be a copier.

(2) As described with reference to FIGS. 1 to 3, 6 to 7B, and 9A to 10B, the contact portion 41a of the protruding member 41 of the first locking mechanism 4 comes into contact with the bottom plate 227 of the image forming apparatus 100, which should not be taken to limit the present invention. It is only required that the first locking mechanism 4 restricts movement of the image forming apparatus 100 in the first direction D1 relative to the mounting base 3. For example, the contact portion 41a of the protruding member 41 of the first locking mechanism 4 may come into contact with the bottom plate 228 of the image forming apparatus 100. Alternatively, the contact portion 41a of the protruding member 41 of the first locking mechanism 4 may come into contact with a frame member of the image forming apparatus 100.

(3) The engaging portion 312a of the engaging member 312 engages with the peripheral wall of the hole 224B as described with reference to FIGS. 1 to 4D, 8A, 8B, and 11, which should not be taken to limit the present invention. It is only required that the second locking mechanism R2 restricts movement of the image forming apparatus 100 in the second direction D2 relative to the mounting base 3. For example, the engaging member 312 may engage with the bottom plate 228 of the image forming apparatus 100. Alternatively, the engaging member 312 may engage with the frame member of the image forming apparatus 100.

INDUSTRIAL APPLICABILITY

The present invention relates to a mounting base and an image forming apparatus set, and has industrial applicability.

The invention claimed is:

1. A mounting base that allows an image forming apparatus to be placed thereon, comprising
a locking mechanism configured to restrict movement of the image forming apparatus relative to the mounting base, wherein
the locking mechanism includes:
a first locking mechanism configured to restrict movement of the image forming apparatus in a first direction relative to the mounting base; and
a second locking mechanism configured to restrict movement of the image forming apparatus in a second direction relative to the mounting base,
the second direction is opposite to the first direction,
when the image forming apparatus is placed at a first position in the mounting base, the locking mechanism restricts movement of the image forming apparatus relative to the mounting base,
the image forming apparatus includes a housing,
the housing has on a bottom surface thereof an opening and includes a bottom plate,
the first locking mechanism includes:
a protruding member capable of protruding into and retreating from the housing through the opening; and
an urging member configured to urge the protruding member toward the opening,
when the image forming apparatus is placed at a second position different from the first position in the mounting base and then moved from the second position to the first position, the protruding member protrudes into the housing of the image forming apparatus through the opening in the housing,
when the image forming apparatus is positioned at the first position in the mounting base, the opening in the housing is opposite to the protruding member of the first locking mechanism,
when the image forming apparatus is positioned at the second position in the mounting base, the bottom plate of the housing pushes the protruding member of the first locking mechanism,
the mounting base further comprises a mounting member in a plate shape on which the image forming apparatus is place,
the image forming apparatus further includes a first engaging member,
the second mechanism includes a second engaging member that engages with the first engaging member as a result of the image forming apparatus being moved in the second direction to the first position in the mounting base, and
the second engaging member is provided on an upper surface of the mounting member.

2. The mounting base according to claim 1, further comprising
a third locking mechanism configured to restrict a movement direction of the image forming apparatus to the first direction and the second direction relative to the mounting base.

3. The mounting base according to claim 2, wherein
the third locking mechanism includes a protrusion,
the image forming apparatus has a recess extending in the first direction, and
through the protrusion being inserted in the recess, the third locking mechanism restricts the movement direction of the image forming apparatus to the first direction and the second direction relative to the mounting base.

4. The mounting base according to claim 3, wherein
the image forming apparatus is separable into a main body and a plurality of feeding units, the main body having a recess in a bottom surface part thereof and being configured to form an image on paper, each of the feeding units having a recess in a bottom surface part thereof and being configured to feed the paper to the main body, and
the recess of the main body and the recesses of the feeding units each serve as the recess of the image forming apparatus.

5. The mounting base according to claim 1, wherein
the protruding member has a rectangular plate shape,
the protruding member is turnable about one side edge of the protruding member as an axis,
when the protruding member is in a protruding state, another side edge of the protruding member is in contact with the bottom plate of the housing, and
the another side edge of the protruding member is opposite to the one side edge thereof.

6. The mounting base according to claim 1, wherein
the first locking mechanism further includes a support member in a plate shape that supports a lower end of the urging member, and
the urging member is located between the support member and the protruding member.

7. The mounting base according to claim 6, wherein
the first locking mechanism further includes a regulating member that regulates a position of the urging member, the regulating member is a bar-shaped member standing from a lower surface of the protruding member,
the urging member is a coil spring, and
the regulating member is inserted through the urging member.

8. The mounting base according to claim 7, wherein
the support member has a hole,
the regulating member is inserted in the hole.

9. The mounting base according to claim 1, wherein
the image forming apparatus is separable into a main body and a plurality of feeding units, the main body having a bottom surface and being configured to form an image on paper, each of the feeding units having a bottom surface and being configured to feed the paper to the main body, and
the first engaging member is provided on each of the bottom surface of the main body and the bottom surface of each of the feeding units.

10. An image forming apparatus set comprising:
an image forming apparatus; and
a mounting base on which the image forming apparatus is placed, wherein
the mounting base includes a locking mechanism configured to restrict movement of the image forming apparatus relative to the mounting base,
the locking mechanism includes:
　a first locking mechanism configured to restrict movement of the image forming apparatus in a first direction relative to the mounting base; and
　a second locking mechanism configured to restrict movement of the image forming apparatus in a second direction relative to the mounting base,
the second direction is opposite to the first direction,
the locking mechanism restricts movement of the image forming apparatus relative to the mounting base when the image forming apparatus is placed at a specific position in the mounting base,
the image forming apparatus includes a housing,
the housing has on a bottom surface thereof an opening and includes a bottom plate,
the first locking mechanism includes:
　a protruding member capable of protruding into and retreating from the housing through the opening; and
　an urging member configured to urge the protruding member toward the opening,
when the image forming apparatus is placed at a second position different from the first position in the mounting base and then moved from the second position to the first position, the protruding member protrudes into the housing of the image forming apparatus through the opening in the housing,
when the image forming apparatus is positioned at the first position in the mounting base, the opening in the housing is opposite to the protruding member of the first locking mechanism,
when the image forming apparatus is positioned at the second position in the mounting base, the bottom plate of the housing pushes the protruding member of the first locking mechanism,
the mounting base further comprises a mounting member in a plate shape on which the image forming apparatus is place,
the image forming apparatus further includes a first engaging member,
the second mechanism includes a second engaging member that engages with the first engaging member as a result of the image forming apparatus being moved in the second direction to the first position in the mounting base, and
the second engaging member is provided on an upper surface of the mounting member.

11. A mounting base that allows an image forming apparatus to be placed thereon, comprising
a locking mechanism configured to restrict movement of the image forming apparatus relative to the mounting base, wherein
the locking mechanism includes:
　a first locking mechanism configured to restrict movement of the image forming apparatus in a first direction relative to the mounting base; and
　a second locking mechanism configured to restrict movement of the image forming apparatus in a second direction relative to the mounting base,
the second direction is opposite to the first direction,
when the image forming apparatus is placed at a first position in the mounting base, the locking mechanism restricts movement of the image forming apparatus relative to the mounting base,
the image forming apparatus includes a housing,
the housing has on a bottom surface thereof an opening and includes a bottom plate,
the first locking mechanism includes:
　a protruding member capable of protruding into and retreating from the housing through the opening; and
　an urging member configured to urge the protruding member toward the opening,
the protruding member has a rectangular plate shape,
the protruding member is turnable about one side edge of the protruding member as an axis,
when the protruding member is in a protruding state, another side edge of the protruding member is in contact with the bottom plate of the housing, and
the another side edge of the protruding member is opposite to the one side edge thereof.

12. The mounting base according to claim 11, further comprising
a third locking mechanism configured to restrict a movement direction of the image forming apparatus to the first direction and the second direction relative to the mounting base.

13. The mounting base according to claim 12, wherein
the third locking mechanism includes a protrusion,
the image forming apparatus has a recess extending in the first direction, and
through the protrusion being inserted in the recess, the third locking mechanism restricts the movement direction of the image forming apparatus to the first direction and the second direction relative to the mounting base.

14. The mounting base according to claim 13, wherein
the image forming apparatus is separable into a main body and a plurality of feeding units, the main body having a recess in a bottom surface part thereof and being configured to form an image on paper, each of the feeding units having a recess in a bottom surface part thereof and being configured to feed the paper to the main body, and
the recess of the main body and the recesses of the feeding units each serve as the recess of the image forming apparatus.

15. The mounting base according to claim 11, wherein
the first locking mechanism further includes a support member in a plate shape that supports a lower end of the urging member, and
the urging member is located between the support member and the protruding member.

16. The mounting base according to claim 15, wherein
the first locking mechanism further includes a regulating member that regulates a position of the urging member,
the regulating member is a bar-shaped member standing from a lower surface of the protruding member,
the urging member is a coil spring, and
the regulating member is inserted through the urging member.

17. The mounting base according to claim 16, wherein
the support member has a hole,
the regulating member is inserted in the hole.

* * * * *